United States Patent [19]

You

[11] Patent Number: 5,618,087
[45] Date of Patent: Apr. 8, 1997

[54] 2-POSITION 3-WAY SOLENOID VALVE, MODULATOR AND ANTI-LOCK BRAKE SYSTEM WITH THE VALVE

[75] Inventor: Jang-Yeol You, Seoul, Rep. of Korea

[73] Assignee: Daewoo Electronics Co., Ltd., Seoul, Rep. of Korea

[21] Appl. No.: 553,179

[22] Filed: Nov. 7, 1995

[30] Foreign Application Priority Data

Aug. 18, 1995 [KR] Rep. of Korea .................. 95-25383

[51] Int. Cl.⁶ .................................................. B60T 8/34
[52] U.S. Cl. .................................. 303/119.2; 137/596.17
[58] Field of Search ........................ 303/119.2, 113.1, 303/116.4, 116.2; 137/596.17, 596.16; 251/129.01, 129.15

[56] References Cited

U.S. PATENT DOCUMENTS

| | | | |
|---|---|---|---|
| 4,944,331 | 7/1990 | Tackett | 303/119.2 |
| 5,022,717 | 6/1991 | Heibel et al. | 303/119.2 |
| 5,218,996 | 6/1993 | Schmitt-Matzon | 303/119.2 |
| 5,354,123 | 10/1994 | Albert | 303/116.2 |
| 5,407,260 | 4/1995 | Isshiki et al. | 303/119.2 |
| 5,460,438 | 10/1995 | Hellmann et al. | 303/119.2 |

FOREIGN PATENT DOCUMENTS 1137971  6/1957  France ................ 303/119.2

*Primary Examiner*—Matthew C. Graham
*Attorney, Agent, or Firm*—Lowe, Price, LeBlanc & Becker

[57] ABSTRACT

A 2-position 3-way solenoid valve having first, second and third ports and first and second chambers. The first chamber is communicated with the first port and the second chamber is communicated with the second and third ports. The chambers is partitioned by a barrier wall and are communicated with each other by a opening formed to the barrier wall. In response to a valve-actuated signal, a spool is moved in lengthwise direction, so that the opening and the third port are opened alternatively. When the third port is closed, the hydraulic pressure generated from a hydraulic pump is supplied to a brake wheel cylinder through the first and second ports to increase braking pressure. When the opening is closed, the hydraulic pressure within the brake wheel cylinder is decreased through the second and third ports to decrease braking pressure.

13 Claims, 8 Drawing Sheets

2-POSITION 3-WAY SOLENOID VALVE, MODULATOR AND ANTI-LOCK BRAKE SYSTEM WITH THE VALVE

BACKGROUND OF THE INVENTION

1. Field of the Invention

The present invention relates to a solenoid valve, and a modulator and an anti-lock brake system with the solenoid valve, more particularly to a 2-position 3-way (hereinafter simply referred to as "2/3") solenoid valve for an anti-lock brake system, a compact type of modulator and an anti-lock brake system with the solenoid valve.

2. Description of the Prior Art

Presently, an anti-lock brake system which prevents wheels from locking while performing a braking operation of a vehicle is widely utilized. If wheels are locked during the braking operation to slip on a road surface, a friction force between tires and the road surface is reduced to lengthen the braking distance. The anti-lock brake system repeatedly increases, holds or decreases the braking pressure exerted on the wheels to impede the locking of wheels. The increase of braking pressure is generally referred to as an increase mode, the hold thereof as a hold mode, and the decrease thereof as a decrease mode. The anti-lock brake system is generally composed of a pressure generating source, which is not a master cylinder, for example, a pump and the like, valves operated by an electrical signal, sensors for monitoring a rotating speed of the wheels and a controller for opening/closing the valves in accordance with a predetermined algorithm for the purpose of acquiring an effective braking operation.

FIG. 1A is a schematic hydraulic circuit diagram for showing a conventional anti-lock brake system utilizing 2-position 2-way (hereinafter simply referred to as "2/2") solenoid valves. In an increase mode, first and second 2/2 solenoid valves S220 and S 221 are de-energized to open first valve S220 connected to an outlet of a hydraulic pump 120 and close second valve S221 connected to an inlet of hydraulic pump 120, so that a hydraulic pressure generated from hydraulic pump 120 is supplied to brake wheel cylinder mounted to the wheels. In a hold mode, first valve S220 is energized to close first valve S220, so that the pressure of the brake wheel cylinder is maintained constant. In a decrease mode, first and second valves S220 and S221 are energized to close first valve S220 and open second valve S221, so that the pressure of the brake wheel cylinder is decreased. Such a system is stably operated, but two solenoid valves per channel are required. As a result, the utilized number of solenoid valves is increased and the overall anti-lock brake system becomes bulky.

FIG. 1B is a schematic hydraulic circuit diagram for showing a conventional anti-lock brake system utilizing 3-position 3-way (hereinafter simply referred to as "3/3") solenoid valves. In an increase mode, a 3/3 solenoid valve S330 is de-energized, so that a hydraulic pressure generated from a hydraulic pump 120 is supplied to the brake wheel cylinder to increase the braking pressure. In a hold mode, a primary switching signal is applied to 3/3 solenoid valve S330 to close all three ports thereof, so that the pressure of the brake wheel cylinder is maintained constant. In a decrease mode, a secondary switching signal, of which the voltage is about twice that of the primary switching signal, is applied to decrease the pressure of the brake wheel cylinder. In such a system, the utilized number of solenoid valves is decreased, since a solenoid valve per channel is utilized. However, the structure of solenoid valve is complicated, the size thereof is large, an electronic control unit of a complicated structure is required because of performing 2-step voltage control and the response time becomes long. As a result, the system is operated unstably.

In order to overcome the foregoing problems, an anti-lock brake system has been proposed as disclosed in U.S. Pat. No. 4,865,399 to Atkins et al. The system is composed of a hydraulic pump, 2/3 solenoid valves allotted to each wheel and a control means. However, the system doesn't overcome the foregoing problems completely, since the number of valves utilized is not decreased enough, i.e., the system further includes solenoid-operated isolation valves as well as the 2/3 solenoid valves. Therefore, the overall construction of the system is complicated by utilizing a plurality of solenoid-operated valves. Further, the construction of the 2/3 solenoid valve utilized in the system is complex, whereby it is not easy to fabricate the valve.

Meanwhile, a 2/3 solenoid valve has been proposed as disclosed in U.S. Pat. No. 5,135,027 to Nobuaki Miki et al. However, the valve is not for an anti-lock brake system but for a general-purpose hydraulic system. The valve has the construction that a port is closed by the movement of a ball caused by the flow of brake fluid, and hence, the ball moves by the pressure difference. In other words, the ball moves not by the movement of a plunger but by the pressure difference between ports, though electric power is applied to a solenoid coil to move the plunger against the resilient force of a spring. Therefore, if the pressure of an outlet port or an exhaust port is higher than that of an inlet port, the valve doesn't block a backward flow. Further, while a solenoid valve for anti-lock brake system requires a response time of 8 ms or below, the response time of the conventional solenoid valve becomes long for the reason that the movement of the ball is caused by the pressure difference to operate the valve. Moreover, it is impossible that the response time is kept constant, because of fluctuations of the pressure difference of fluid.

SUMMARY OF THE INVENTION

The present invention is devised to solve the foregoing problems. It is a first object of the present invention to provide a 2/3 solenoid valve being operated rapidly, having a simple structure and high reliability and being capable of controlling opening/closing operations of the valve accurately.

It is a second object of the present invention to provide a modulator having a simple structure and a small size, wherein the modulator is for an anti-lock brake system and is provided with the 2/3 solenoid valve.

It is a third object of the present invention to provide an anti-lock brake system being constructed by utilizing one 2/3 solenoid valve per channel.

To achieve the first object of the present invention, there is provided a solenoid valve according to a first embodiment comprising:

a valve body having a housing with a first port for receiving fluid from a fluid generating source, a second port for flowing in/flowing out the fluid and a third port for exhausting the fluid, and a cover hermetically coupled to one end of the housing for closing the one end of the housing;

a barrier wall for partitioning a chamber surrounded by the housing and cover within the valve body into first and second chambers and having a first opening for communicating the first chamber with the second chamber, the first chamber being communicated with the first port and the second chamber being communicated with the second and third ports;

opening/closing means movable along lengthwise direction of the valve body for alternatively opening and closing the first opening and the third port in response to an electric signal, and being positioned at a first position of closing the third port and opening the first opening in a normal state that the electric signal is not applied or at a second position of closing the first opening and opening the third port in an active state that the electric signal is applied, whereby the first port is communicated with the second port or the second port is communicated with the third port; and a solenoid assembly having an annular solenoid coil, a bobbin wound by the annular solenoid coil and a pair of electrodes electrically connected to the annular solenoid coil and exposed to the outside of the valve body for moving the opening/closing means to the second position from the first position in response to the electric signal.

To achieve the first object of the present invention, there is provided a solenoid valve according to a second embodiment further comprising an orifice for reducing the fluctuation of hydraulic pressure through the second port and a check valve preferably installed opposite to the orifice for promptly reducing the hydraulic pressure within the second chamber.

The opening/closing means, for example, comprises an armature moving along the lengthwise direction in response to a magnetic force generated by the solenoid assembly; a cover spring, one end thereof supported on a closed end of a hole formed in the center of a protrusion of the cover and the other end thereof supported on the armature; a spring supporting rod fixed to one end of the armature and inserted in the cover spring to support the cover spring; a push rod fixed to the other end of the armature; and a spool integrally formed with the push rod, wherein the cover, the spring supporting rod, the armature and the push rod are included within the first chamber, the spool is included within the second chamber, and the push rod extends through the first opening to be connected to the spool included within the second chamber.

Preferably, the barrier wall is formed by an inlet nozzle, the third port is a second opening formed at an outlet nozzle which is installed opposite to the inlet nozzle, and the diameter of the first opening formed at the inlet nozzle is larger than that of the push rod passing through the first opening to provide a gap between the first opening and the push rod, the gap communicating the first chamber with the second chamber.

The first chamber is formed within the housing to be surrounded by the inlet nozzle, a protrusion formed in the center of the cover and a cylindrical sealing member and the second chamber is formed within the housing to be surrounded by the inlet nozzle and the outlet nozzle.

The bobbin is fitted along the circumference of the cylindrical sealing member, the protrusion is hermetically fitted in one end of the cylindrical sealing member, and the other end thereof is hermetically coupled with an inner surface of the housing.

Further, an inlet valve seating surface and an outlet valve seating surface are formed on the inlet nozzle and the outlet nozzle respectively to seat the spool, and the inlet valve seating surface and the outlet valve seating surface are shaped to match with the spool, whereby the first opening or the second opening is closed, when the spool is seated on the inlet valve seating surface or the outlet valve seating surface.

According to the preferred embodiment, the solenoid valve further comprises a bushing provided between the armature and the barrier wall for supporting the push rod.

To achieve the second object of the present invention, there is provided a modulator for anti-lock brake system comprising:

an electric motor;

first and second pumps driven by the electric motor and provided into a modulator block;

first, second, third and fourth solenoid valves installed into the modulator block for intermitting the fluid flow in response to an electric signal;

first and second dampers provided into the modulator block to be communicated with the respective outlets of the first and second pumps for temporarily receiving the fluid flowing out from the first and second pumps to reduce the fluctuation of hydraulic pressure generated from the first and second pumps; and first and second accumulators provided into the modulator block to be communicated with the respective inlets of the first and second pumps for temporarily receiving the fluid flowing out from the first and second solenoid valves and the third and fourth solenoid valves to reduce the hydraulic pressure within the first to fourth solenoid valves promptly, wherein each of the first to fourth solenoid valves comprises:

a valve body having a housing with a first port for receiving fluid from a fluid generating source, a second port for flowing in/flowing out the fluid and a third port for exhausting the fluid, and a cover hermetically coupled to one end of the housing for closing the one end of the housing;

a barrier wall for partitioning a chamber surrounded by the housing and cover within the valve body into first and second chambers and having a first opening for communicating the first chamber with the second chamber, the first chamber being communicated with the first port and the second chamber being communicated with the second and third ports;

opening/closing means movable along lengthwise direction of the valve body for alternatively opening and closing the first opening and the third port in response to an electric signal, and being positioned at a first position of closing the third port and opening the first opening in a normal state that the electric signal is not applied or at a second position of closing the first opening and opening the third port in an active state that the electric signal is applied, whereby the first port is communicated with the second port or the second port is communicated with the third port; and a solenoid assembly having an annular solenoid coil, a bobbin wound by the annular solenoid coil and a pair of electrodes electrically connected to the annular solenoid coil and exposed to the outside of the valve body for moving the opening/closing means to the second position from the first position in response to the electric signal.

Preferably, three O-rings are provided along the circumference of the first to fourth solenoid valves to maintain the hermetical state between the first to third ports while the first to fourth solenoid valves are installed, whereby the installation of the first to fourth solenoid valves is completed only by inserting them into cylinders for a valve formed in the modulator block.

Further, each of the first and second dampers is formed by a cylinder for a damper and a cover for a damper in the modulator block, and each of the first and second accumulators is formed by a cylinder for an accumulator, a cover for an accumulator and a spring for accumulator in the modulator block.

To achieve the third object of the present invention, there is provided an anti-lock brake system for a vehicle having at least one wheel provided with a wheel brake, a brake pedal operable by the vehicle driver and a master cylinder actuated by the brake pedal and having an outlet connected to supply brake fluid to actuate the wheel brake, the system comprising:

a wheel speed sensor provided to the wheel for sensing the speed of wheel;

a pressure generating portion including an electric motor and at least one pump driven by the electric motor and having an inlet and an outlet;

a 2-position 3-way solenoid valve having a first port communicated with both the outlet of the pump and the master cylinder, a second port communicated with the brake wheel cylinder and a third port communicated with the inlet of the pump, the valve only movable between a first position wherein the first and second ports are communicated with each other to increase the pressure of the brake wheel cylinder and a second position wherein the second and third ports are communicated with each other to decrease the pressure of the brake wheel cylinder;

a damper communicated with the outlet of the pump for temporarily receiving the brake fluid flowing out from the pump to reduce the fluctuation of hydraulic pressure generated therefrom;

an accumulator communicated with the inlet of the pump for temporarily receiving the fluid flowing out from the 2-position 3-way solenoid valve to reduce the hydraulic pressure within the 2-position 3-way solenoid valve promptly; and control means for controlling the operation of the 2-position 3-way solenoid valve to increase, decrease or hold pressure of the brake wheel cylinder, the control means receiving a speed signal from the wheel speed sensor and outputting a valve-actuated signal having a predetermined time period to the solenoid valve whereby the solenoid valve is maintained in the first position or the second position during the predetermined time period in response to the valve-actuated signal, the 2-position 3-way solenoid valve comprising:

a valve body having a housing with the first port for receiving fluid from the pressure generating portion, the second port for flowing in/flowing out the fluid and the third port for exhausting the fluid, and a cover hermetically coupled to one end of the housing for closing the one end of the housing;

a barrier wall for partitioning a chamber surrounded by the housing and cover within the valve body into first and second chambers and having a first opening for communicating the first chamber with the second chamber, the first chamber being communicated with the first port and the second chamber being communicated with the second and third ports;

opening/closing means movable along lengthwise direction of the valve body for alternatively opening and closing the first opening and the third port in response to an electric signal, and being positioned at the first position of closing the third port and opening the first opening in a normal state that the electric signal is not applied or at the second position of closing the first opening and opening the third port in an active state that the electric signal is applied, whereby the first port is communicated with the second port or the second port is communicated with the third port; and a solenoid assembly having an annular solenoid coil, a bobbin wound by the annular solenoid coil and a pair of electrodes electrically connected to the annular solenoid coil and exposed to the outside of the valve body for moving the opening/closing means to the second position from the first position in response to the electric signal.

The valve-actuated signal may be a pulse-width-modulation signal or a bang-bang control signal.

In the 2/3 solenoid valve according to the present invention, the first and second ports are communicated with each other, since the solenoid coil is de-energized so that the spool closes the third port by a resilient force of spring. When the solenoid coil is energized, the spool is retracted by overcoming the resilient force to open the third port and close the first port, so that the second and third ports are communicated with each other.

The 2/3 solenoid valve according to the present invention is simply constructed and has the reduced number of component parts. Therefore, the possibility of operational errors becomes low to enhance the reliability of operation. Also, the response time of the 2/3 solenoid valve becomes short, so that an anti-lock brake system having the good performance can be constructed.

The modulator according to the present invention is provided with four 2/3 solenoid valves and serves for generating hydraulic pressure and intermitting the flow of brake fluid in response to control signal from the control means.

The modulator according to the present invention can be assembled easily and has a compact design capable of reducing the installation space of modulator and the weight thereof, and hence, can be fabricated at a low cost.

The anti-lock brake system according to the present invention starts to operate on the basis of a speed signal from the wheel speed sensor when a driver steps on the brake pedal. In an increase mode, the hydraulic pressure generated from pump is supplied to brake wheel cylinder through first and second ports of 2/3 solenoid valve according to the present invention. At this time, the solenoid coil is de-energized, because the 2/3 solenoid valve is a normally open type. In a decrease mode, the solenoid coil is energized to close the first port and communicate the second port with the third port. If the second and third ports are communicated with each other, a part of fluid stored in the brake wheel cylinder is transmitted to the accumulator through the third port, so that the braking pressure is reduced. A hold mode is acquired by repeating the opening/closing of the 2/3 solenoid valve under a PWM signal control or a bang-bang control.

The anti-lock brake system according to the present invention is simply constructed to reduce the possibility of the erroneous operation, since one 2/3 solenoid valve is assigned to one channel so that the number of solenoid driven valves is reduced. Therefore, the anti-lock brake system has the reliable braking characteristic.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

Figure 1A:
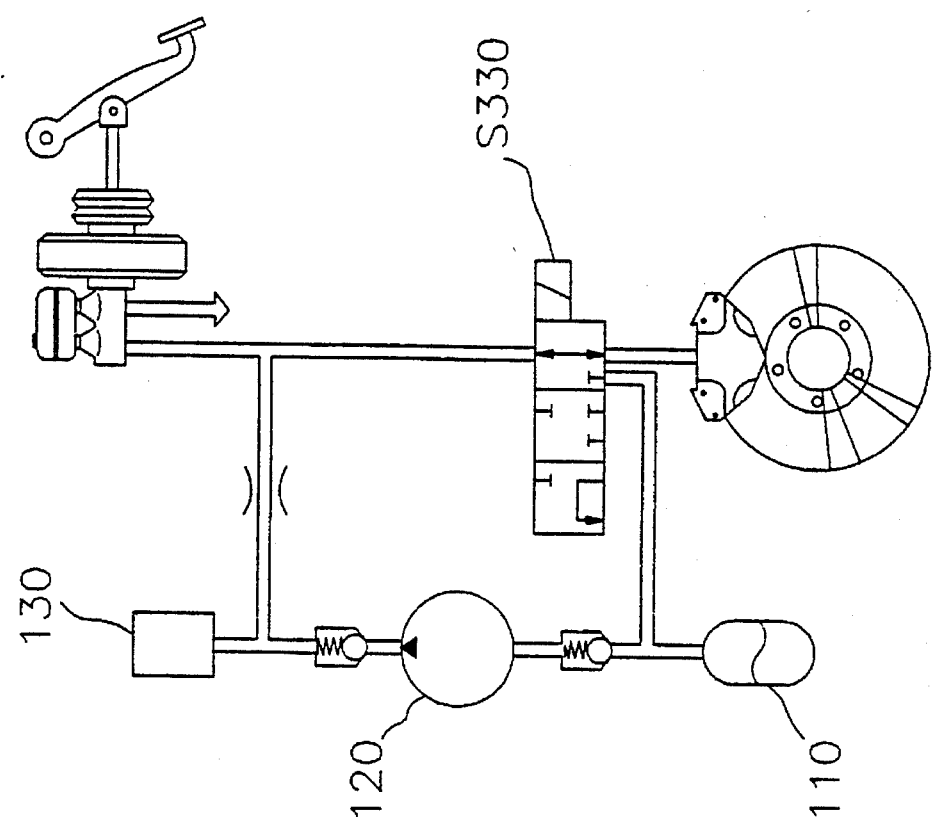
FIG. 1A is a schematic view showing a hydraulic system of a conventional anti-lock brake system utilizing 2/2 solenoid valve.
Figure 1B:
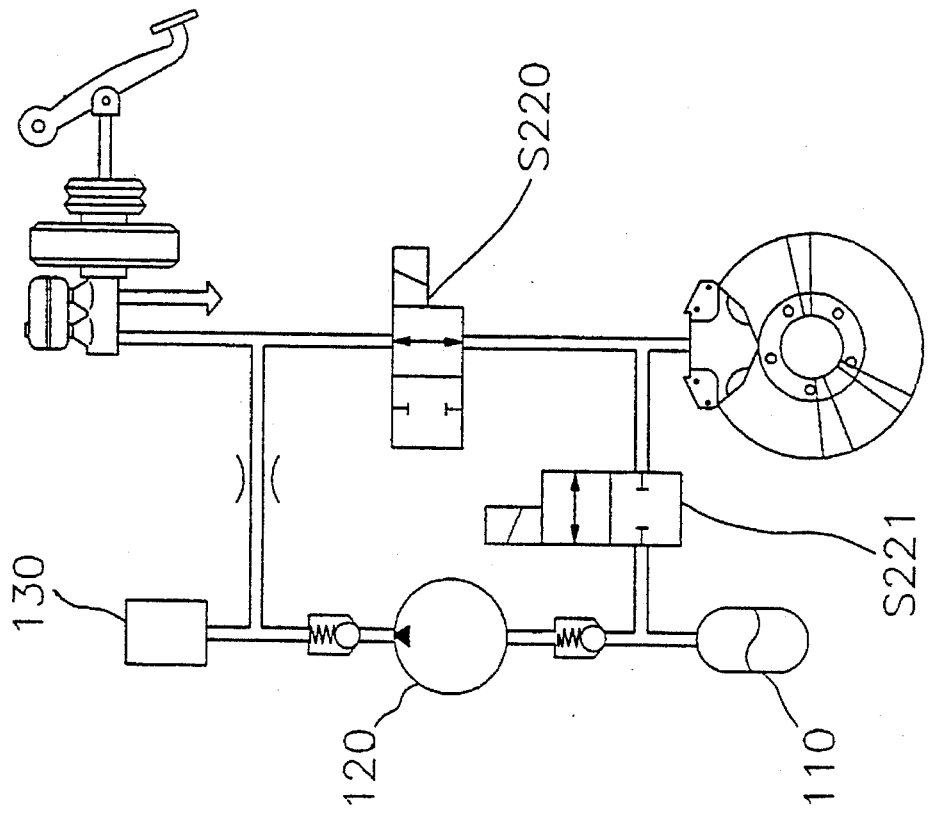
FIG. 1B is a schematic view showing a hydraulic system of a conventional anti-lock brake system utilizing 3/3 solenoid valve.

Hereinafter, the preferred first embodiment of a 2/3 solenoid valve according to the present invention will be described in detail with reference to FIG. 2.

The 2/3 solenoid valve 100 according to this embodiment includes a valve body 10 and a cover hermetically coupled with one end of valve body 10. Within valve body 10, a first chamber 44 and a second chamber 46 are provided, in which first chamber 44 is a space enclosed with cover 14 and a inlet nozzle 34 and second chamber 46 is a space enclosed with inlet nozzle 34 and a outlet nozzle 36.

Within first chamber 44, a cover spring 16, a spring supporting rod 22, an armature 24, a push rod 26 and a bushing 32 are included. One end of cover spring 16 is supported by cover 14 and the other end thereof is supported by armature 24 with spring supporting rod 22 inserted. Spring supporting rod 22 is fixed in the center of one end of armature 24 and serves as a supporting/guiding means of cover spring 16. Armature 24 is made of ferromagnetic materials and may be made of the same materials as those of valve body 10. At the other end of armature 24, push rod 26 is fixed.

Push rod 26 extends through bushing 32 and inlet nozzle 34, and a spool 42 is integrally provided at one end of push rod 26. Push rod 26 is fabricated with armature 24 by pressing. Bushing 32 serves for supporting push rod 26 and is provided with through holes through which the fluid passes as well as an opening through which push rod 26 is inserted. The shape and number of the through holes are not especially limited as long as the solenoid valve is operated smoothly. Spool 42 reciprocates axially to open and close inlet nozzle 34 or outlet nozzle 36 alternatively. Push rod 26 and spool 42 are manufactured by cold rolling, for example, and preferably, have Rockwell hardness of 60 to 65. One end of spool 42 landing on a outlet valve seating surface 37 has a hemispherical shape, and outlet valve seating surface 37 is shaped to match with the one end of spool 42 landing thereon.

The diameter of inlet nozzle hole 38 is larger than that of push rod 26 passing therethrough, so that a gap is formed between inlet nozzle hole 38 and push rod 26. Through the gap, first and second chambers 44 and 46 are communicated with each other. Inlet valve seating surface 35 formed to inlet nozzle 34 is shaped to match with the other end of spool 42 landing thereon, so that the fluid flow through inlet nozzle 34 is blocked while landing of spool 42.

2/3 solenoid valve 100 has a first port 20, a second port 30 and a third port 40, first port 20 communicated with first chamber 44 and second and third ports 30 and 40 communicated with second chamber 46. According to the embodiment, third port 40 is not formed to valve body 10 but provided to outlet nozzle 36 as a outlet nozzle hole 39. First port 20 is communicated with a master cylinder 82 (see FIG. 7) of vehicle brake system, second port 30 is communicated with brake wheel cylinders(not shown) mounted to each wheel, and third port 40 is communicated with an accumulator 66 or 68 (see FIG. 5). In a normal state, in which electric power is not supplied, spool 42 remains landed on outlet valve seating surface 37 to close third port 40, since 2/3 solenoid valve 100 is a normally open type. Thus, in the normal state, the braking pressure generated from master cylinder 82 is provided to the brake wheel cylinder through first port 20, first chamber 44, inlet nozzle 34, second chamber 46 and second port 30. When a solenoid coil 12 is energized, the magnetic flux generated from a solenoid assembly 11 permits armature 24 to overcome the resilient force of cover spring 16, so that armature 24 is retracted toward cover 14. Accordingly, spool 42 is forced to land on inlet valve seating surface 35 formed on inlet nozzle 34 after being separated from outlet valve seating surface 37 formed on outlet nozzle 36, so that spool 42 is in a closing position to close inlet nozzle 34. When spool 42 is in the closing position, first port 20 is closed, third port 40 is opened and second and third ports 30 and 40 are communicated with each other.

Solenoid assembly 11 is composed of a annular solenoid coil 12 and a bobbin 13 wound with solenoid coil 12. Bobbin 13 is integrally formed by molding, for example, in order to prevent the fluid from intruding in solenoid coil 12 wound in bobbin 13. Further, solenoid assembly 11 is fitted on the circumference of a cylindrical sealing member 15, which serves for protecting solenoid assembly 11 from the fluid being in first chamber 44 by means of sealing first chamber 11. Cylindrical sealing member 15 consists of non-magnetic materials in order to block the magnetic flux generated from solenoid assembly 11. Electric terminals 18 are exposed to the exterior of valve body 10 and connected with conductive wires each to energize solenoid coil 12.

In one end of cylindrical sealing member 15, a protrusion 17 of cover 14 is inserted in order not to leak the fluid. Protrusion 17 is shaped cylindrically to be fitted in the inner surface of sealing member 15 and at the center of protrusion 17, a hole 19 of which one end is closed is formed to insert cover spring 16. One end of cover spring 16 is supported on the closed end of hole 19 and the other end thereof is supported on armature 24, and hence, armature 24 is pressed toward bushing 32 by a predetermined force.

First, second and third O-rings 28, 28' and 28" are provided to first and second U-shaped grooves 29 and 29' and an L-shaped groove 31 formed on the outer surface of valve body 10 to coaxially surround valve body 10. First, second and third O-rings 28, 28' and 28" are provided for maintaining the hermetic state among first, second and third ports 20, 30 and 40 when solenoid valve 100 is installed in a modulator block 76 (shown FIG. 6) for an anti-lock brake system. Accordingly, when solenoid valve 100 is installed in modulator block 76, a space has a substantially equal pressure, the space being communicated with first port 20 and surrounded by first and second O-rings 28 and 28' mounted on each of first and second U-shaped grooves 29 and 29', modulator block 76 and valve body 10. Also, a space has a substantially equal pressure, the space being communicated with second port 30 and surrounded by second O-ring 28' mounted on second U-shaped groove 29', third O-ring 28" mounted on L-shaped groove 31, modulator block 76 and valve body 10. Further, a space has a substantially equal pressure, the space being communicated with third port 40 and surrounded by third O-ring 28" mounted on L-shaped groove 31, modulator block 76, valve body 10 and outlet nozzle 36.

Figure 3:
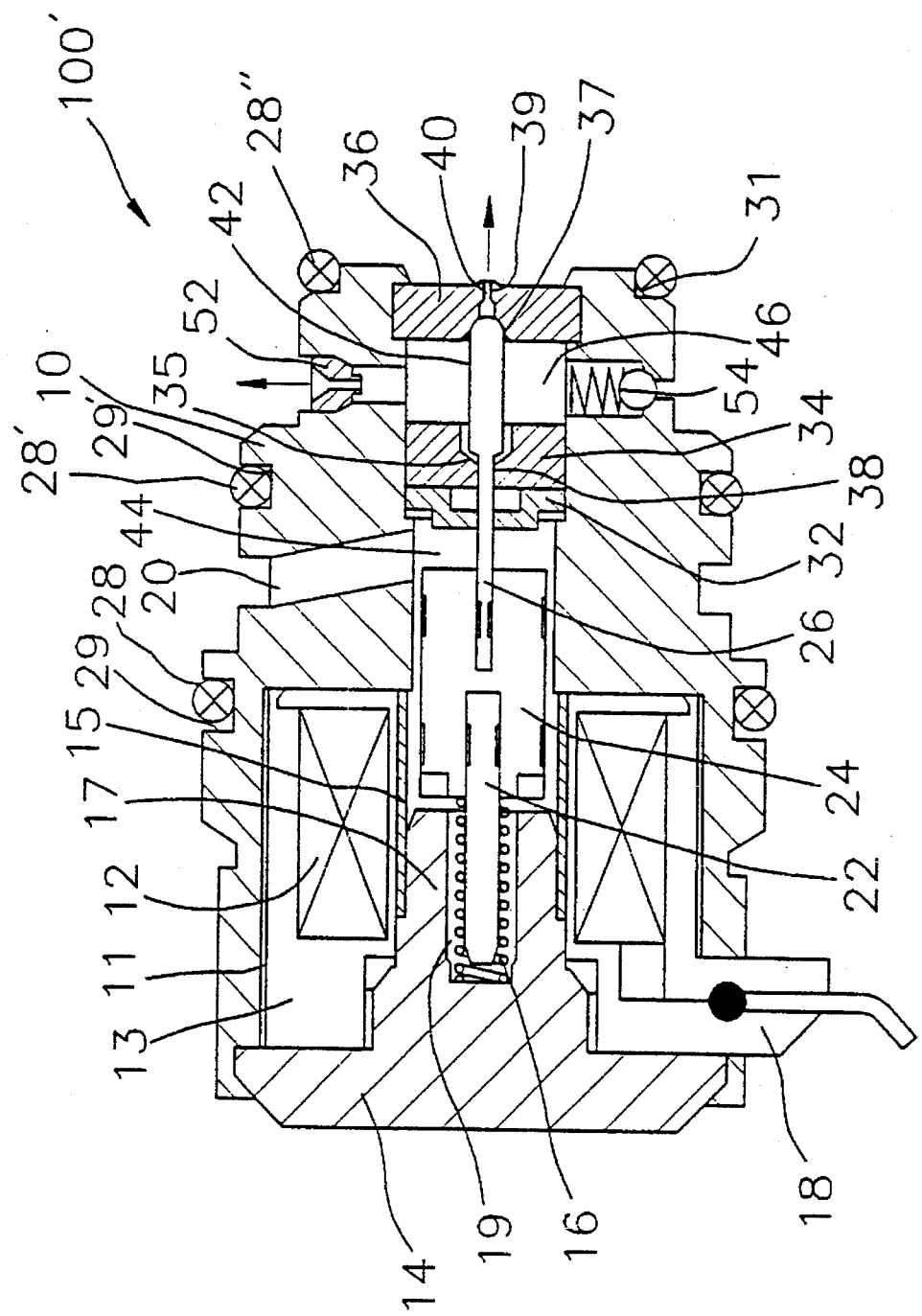
FIG. 3 is a sectional view of a 2/3 solenoid valve according to a second embodiment of the present invention.
Figure 4:
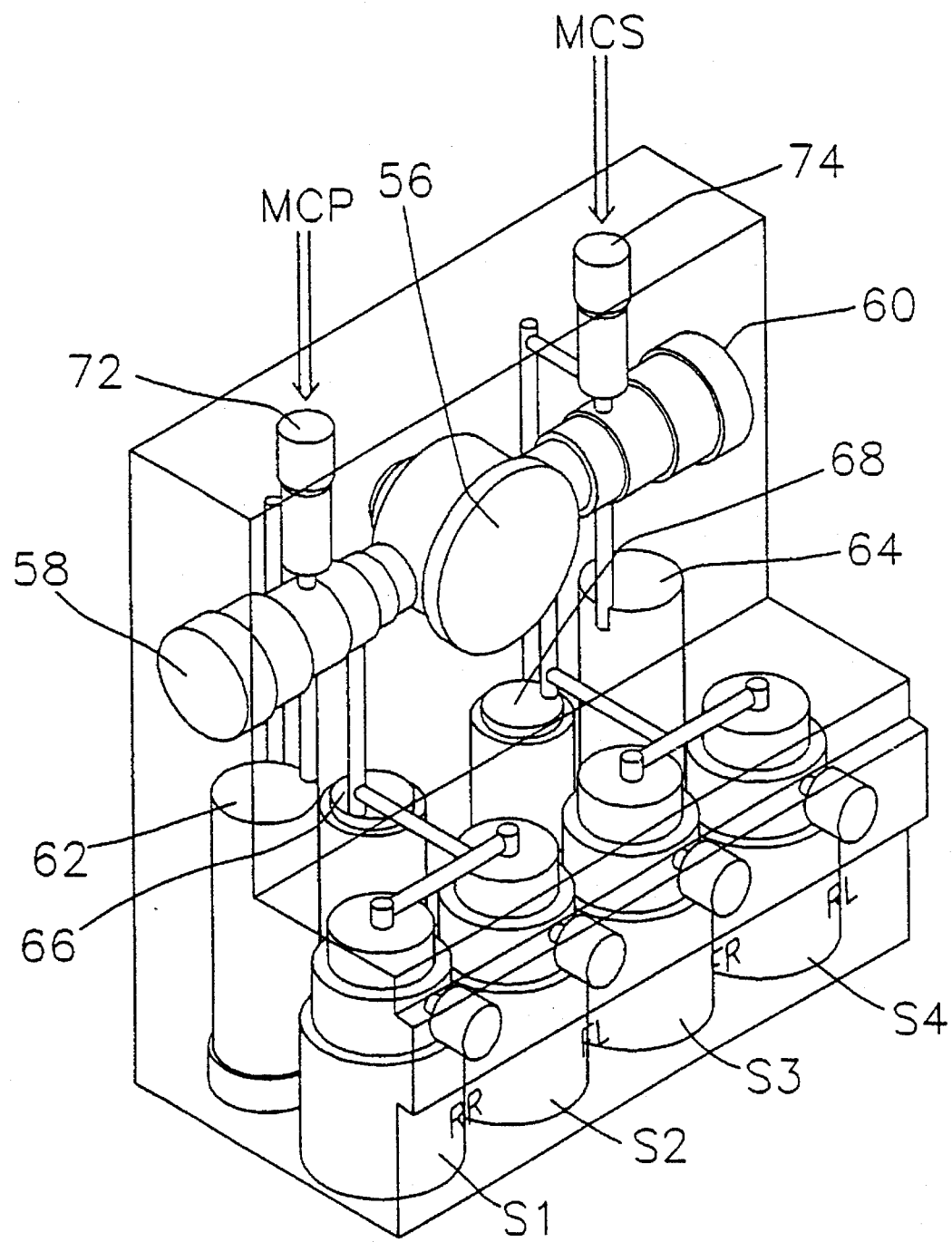
FIG. 4 is a perspective view showing the inner structure of a modulator for anti-lock brake system provided with the 2/3 solenoid valve according to the present invention.
Figure 5:
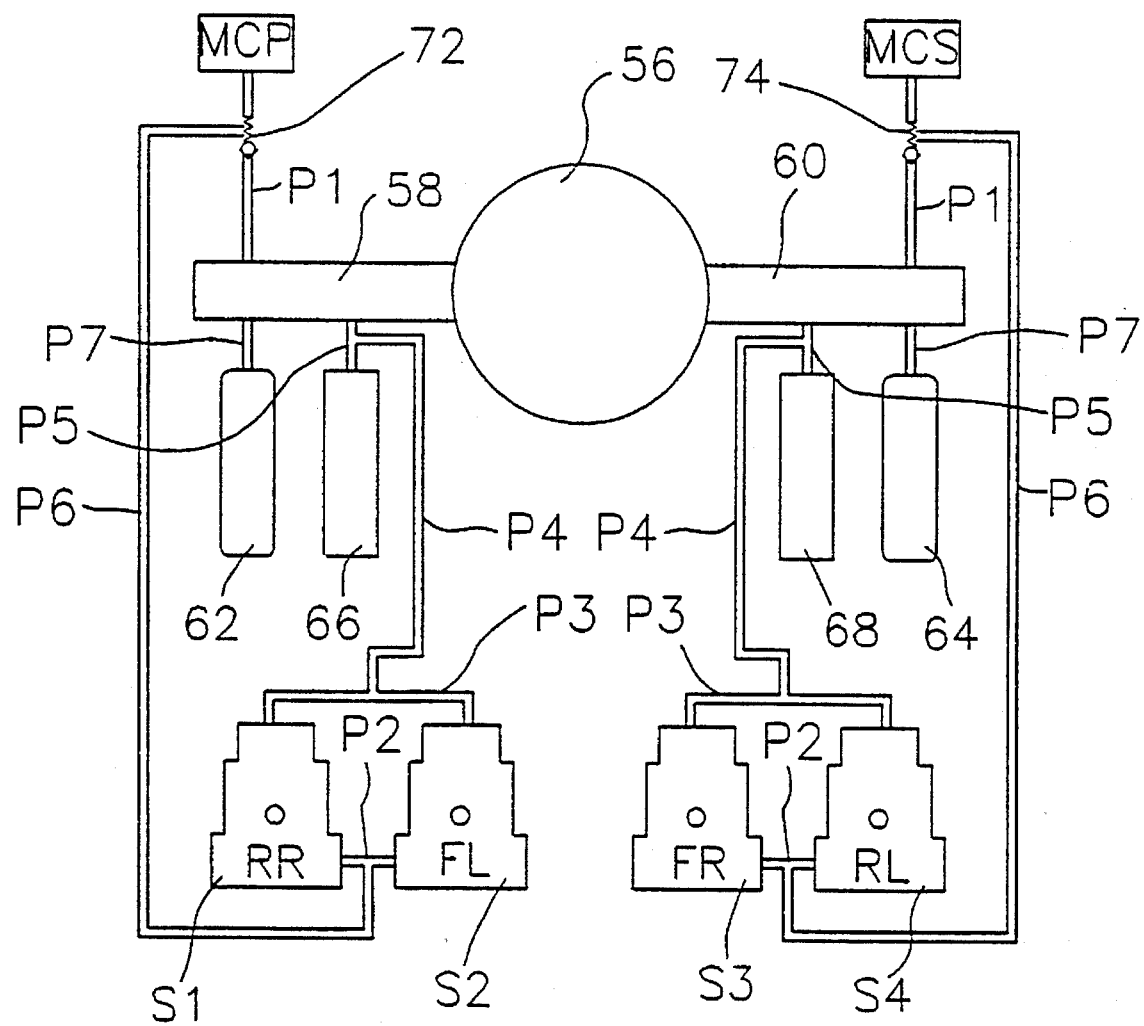
FIG. 5 is a hydraulic circuit diagram of the modulator according to the present invention.
Figure 6:
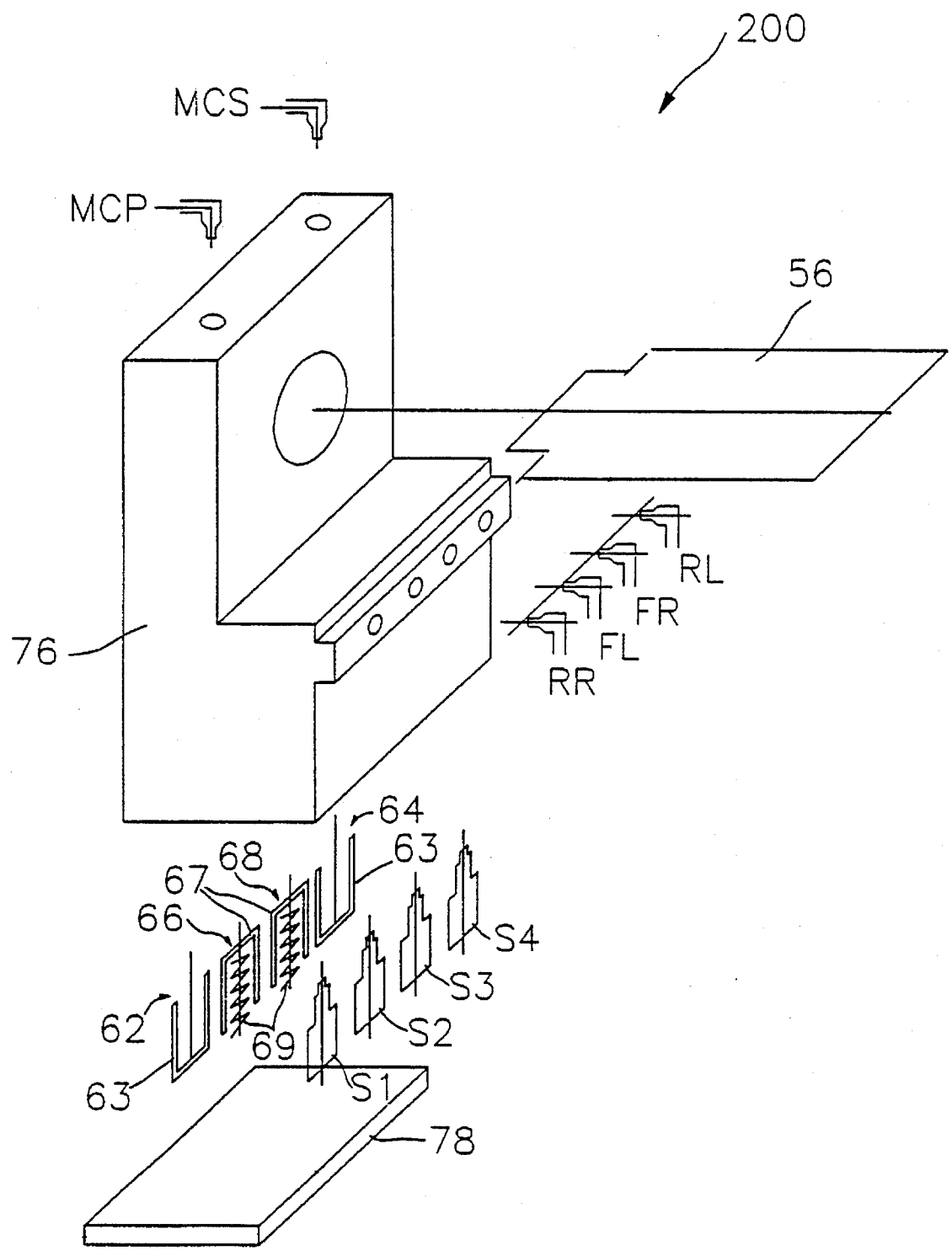
FIG. 6 is an exploded view of the modulator according to the present invention.

In FIG. 3, a 2/3 solenoid valve 100' according to a second embodiment of the present invention is shown. In the second embodiment, the same reference numerals as the first embodiment represent the same constituents. The second embodiment is identical with the first embodiment except that an orifice 52 and a first check valve 54 are provided. Orifice 52 and first check valve 54 are mounted in second port 30, preferably, with the opposing positional relationship between each other. The hydraulic pressure generated from a generating source is supplied only through orifice 52. By a drop in pressure induced by passing the fluid through orifice 52, the fluctuation of hydraulic pressure in the brake wheel cylinder is almost removed. First check valve 54 serves for shortening the operating time of 2/3 solenoid valve 100' by the prompt passage of the fluid, when second and third ports 30 and 40 are communicated with each other to transmit the fluid from second port 30 to third port 40.

with reference to FIGS. 4 to 6, hereinafter a modulator 200 for an anti-lock brake system being provided with 2/3 solenoid valve 100 or 100' according to the present invention will be described in detail. In the drawings, S1, S2, S3 and S4 designate first, second, third and fourth solenoid valves, respectively and the valves may be 2/3 solenoid valves shown in FIGS. 2 and 3.

In modulator block 76, a plurality of fluid passages are formed for connecting each of constituents to transmit the fluid therebetween. First passages P1 and P1 communicate a primary master cylinder MCP (see FIG. 7) and a secondary master cylinder MCS (see FIG. 7) with the outlets of first and second pumps 58 and 60, respectively.

At each of branching points of first passages P1 and P1 toward sixth passages P6 and P6, second and third check valves 72 and 74 are provided in order that the hydraulic pressure generated from primary and secondary master cylinders MCP and MCS are not provided to the outlet of first and second pumps 58 and 60.

First ports 20 and 20 of first and second solenoid valves S1 and S2 are communicated with each other by one second passage P2, and first ports 20 and 20 of third and fourth solenoid valves S3 and S4 are communicated with each other by the other second passage P2. Third ports 40 and 40 of first and second solenoid valves S1 and S2 are communicated with each other by one third passage P3, and third ports 40 and 40 of third and fourth solenoid valves S3 and S4 are communicated with each other by the other third passage P3.

First and second accumulators 66 and 68 are communicated with the inlet of each of first and second pumps 58 and 60 by fifth passages P5 and P5, and first and second dampers 62 and 64 are communicated with the outlet of each of first and second pumps 58 and 60 by seventh passages P7 and P7.

Second passages P2 and P2 are connected to third passages P3 and P3 by fourth passages P4 and P4, and first passages P1 and P1 are connected to second passages P2 and P2 by sixth passages P6 and P6.

In modulator block 76, first, second, third and fourth solenoid valves S1, S2, S3 and S4 according to the present invention are installed to intermittently provide the hydraulic pressure generated from first and second pumps 58 and 60 to four wheels RR, FL, FR and RL. The installation of first, second, third and four solenoid valves S1, S2, S3 and s4 is completed only by inserting them into valve-installing cylinders formed in modulator block 76, since each of first, second, third and fourth solenoid valves S1, S2, S3 and S4 is provided with first, second and third O-rings 28, 28' and 28" (see FIG. 2) to maintain the hermetic state between the ports when installing.

First and second dampers 62 and 64 are composed of cylinders(not shown) for a damper formed in modulator block 76 and a pair of damper covers 63, and first and second accumulators 66 and 68 are composed of cylinders (not shown) for an accumulator formed in modulator block 76, a pair of accumulator covers 67 and a pair of accumulator springs 69.

First and second dampers 62 and 64 retain temporarily the fluid flowing out the outlet of first and second pumps 58 and 60 to reduce the fluctuation of hydraulic pressure caused by first and second pumps 58 and 60.

When the fluid within second chambers 46 of first and second solenoid valves S1 and S2 flows out third ports 40 thereof to reduce the hydraulic pressure of brake wheel cylinder, first accumulator 66 retains temporarily the fluid flowing out third ports 40, so that the hydraulic pressure of second chamber 46 of first and second solenoid valves S1 and S2 is reduced promptly. When the fluid within second chambers 46 of third and fourth solenoid valves S3 and S4 flows out third ports 40 thereof to reduce the hydraulic pressure of brake wheel cylinder, second accumulator 68 retains temporarily the fluid flowing out third ports 40, so that the hydraulic pressure of second chamber 46 of third and fourth solenoid valves S3 and S4 is reduced promptly.

The hydraulic pressure generated from first pump 58 is provided to first ports 20 of first and second solenoid valves S1 and S2 through first passage P1, second check valve 72, sixth passage P6 and second passage P2. The hydraulic pressure generated from second pump 60 is provided to first ports 20 of third and fourth solenoid valves S3 and S4 through first passage P1, third check valve 74, sixth passage P6 and second passage P2.

Figure 7:
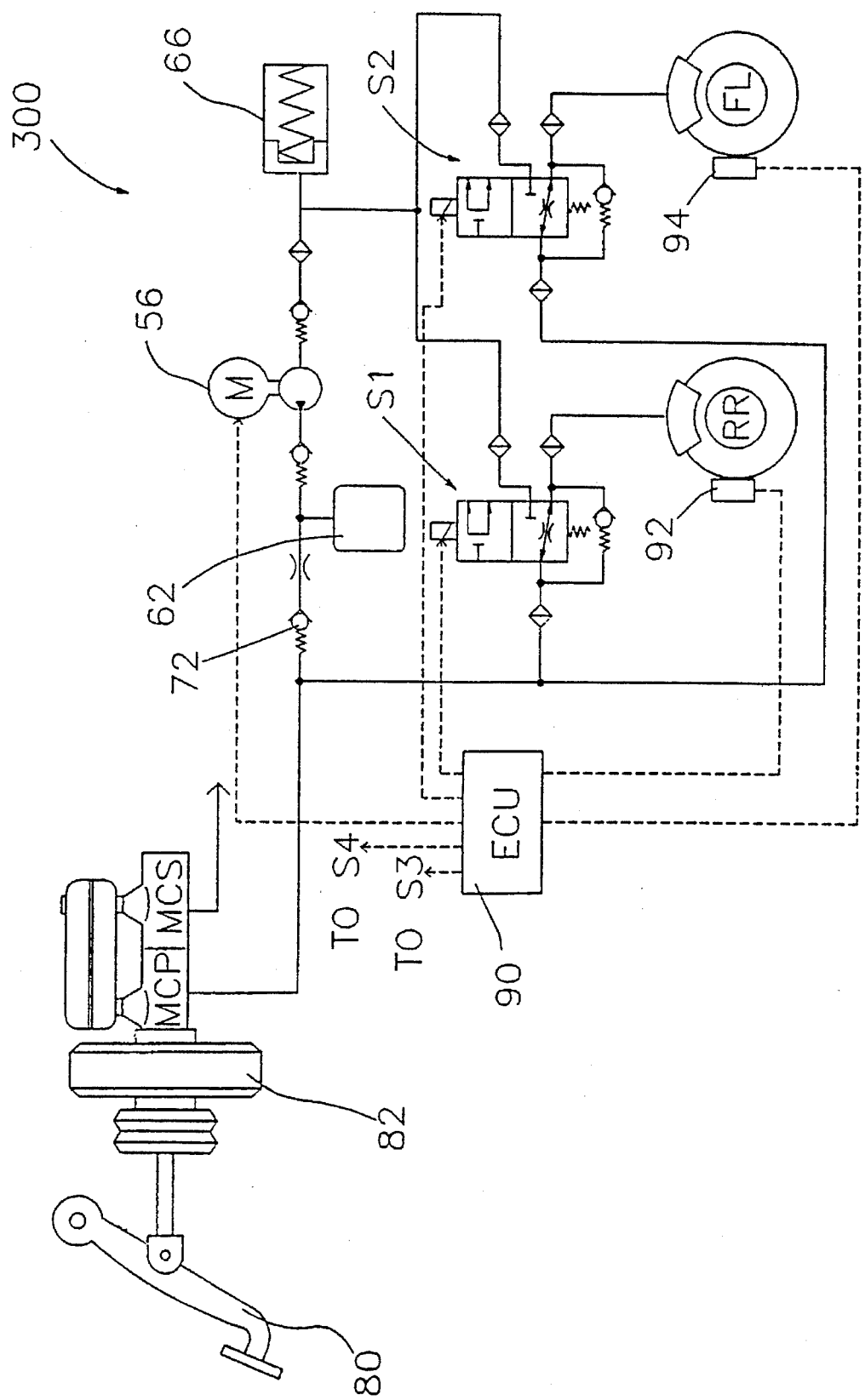
FIG. 7 is a constructional view of an anti-lock brake system provided with the 2/3 solenoid valve according to the present invention.

FIG. 7 is a constructional view of an anti-lock brake system 300 composed of 2/3 solenoid valve 100 or 100' and modulator 200 according to the present invention.

Anti-lock brake system 300 according to the present invention is for the brake system of the diagonal split type that one front wheel and the diagonally opposite rear wheel are assigned to each of two master cylinders, but it is especially limited to this type. To promote the understanding, FIG. 7 shows only the hydraulic pressure circuit diagram including primary master cylinder MCP and rear right and front left wheels RR and FL.

On wheel RR and FL, first and second wheel speed sensors 92 and 94 are installed respectively and the speed signal outputted therefrom is inputted to an ECU 90 for controlling the operation of anti-lock brake system 300.

First, second, third and fourth solenoid valves S1, S2, S3 and S4 and a motor for driving first and second pumps 58 and 60 are connected to the output of ECU 90.

With reference to the drawings, hereinafter the operation of 2/3 solenoid valve according the present invention and anti-lock brake system having the 2/3 solenoid valve will be described.

In a normal state that anti-lock brake system is not operated, the hydraulic pressure generated from primary and secondary master cylinders MCP and MCS is provided to the brake wheel cylinders, each of them being installed on the respective four wheels RR, FL, FR and RL, after passing through first and second ports 20 and 30 successively, if a driver steps on a brake pedal 80. When anti-lock brake system 300 is operated, motor driving signal is outputted from ECU 90 to drive motor 56 and valve opening/closing signal is outputted from ECU 90 to open/close first and third ports 20 and 30 of each of first, second, third and fourth solenoid valves S1, S2, S3 and S4 in accordance with a predetermined algorithm stored in ECU 90, whereby the braking pressure is increased, held or decreased.

In an increase mode, the hydraulic pressure generated from first and second pumps 58 and 60 is provided to first passages P1 and P1 and thereafter, passes through the same path as in the normal state that anti-lock brake system is not operated, so that the braking pressure is increased. Since 2/3 solenoid valve according to the present invention is a normally open type, in the de-energized state of solenoid coil 12, spool 42 is landed on outlet valve seating surface 37 by the resilient force of cover spring 16 to close third port 40 and hence, the hydraulic pressure generated from first and second pumps 58 and 60 is provided to the brake wheel cylinders via the same path as in the normal state. Each of first and second dampers 62 and 64 is disposed at the outlet of first and second pumps 58 and 60 to reduce the fluctuation caused by the pumping operation of first and second pumps 58 and 60.

In a decrease mode, solenoid coil 12 is energized to generate the magnetic flux, so that armature 24 overcomes the resilient force of cover spring 16 to be retracted toward cover 14. Spool 42 is separated from outlet valve seating surface 37 and landed on inlet valve seating surface 35, so that third port 40 is opened and first port 20 is closed. Therefore, the fluid in the brake wheel cylinder is exhausted toward first and second accumulators 66 and 68 through second and third ports 30 and 40, thereby decreasing the braking pressure.

A hold mode is performed by operating spool 42 repetitively by means of utilizing a pulse width modulation or a bang-bang control. If solenoid coil 12 is energized and de-energized, repetitively, first and second ports 20 and 30 are opened/closed repetitively by the movement of spool 42, thereby keeping the braking pressure constant.

Figure 2:
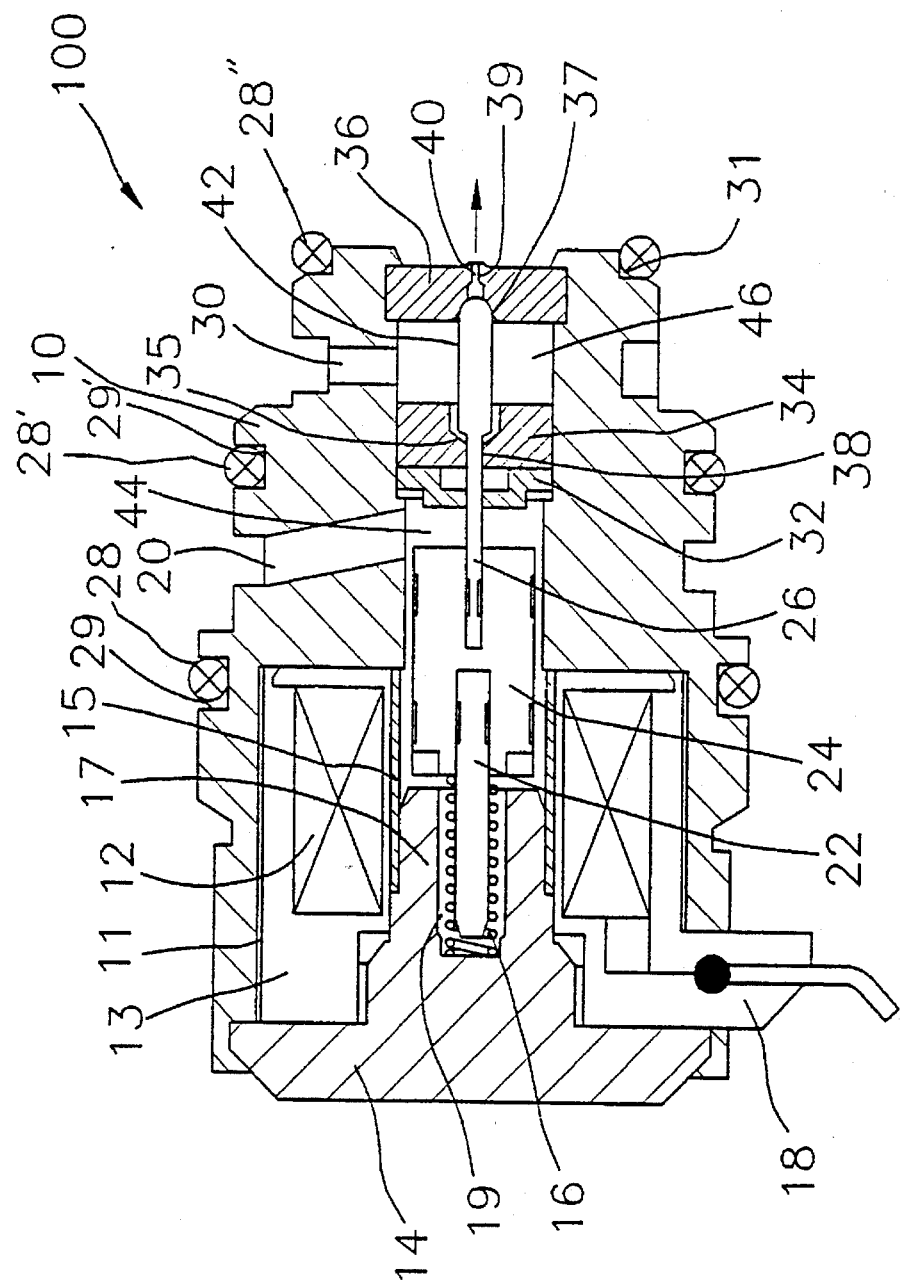
FIG. 2 is a sectional view of a 2/3 solenoid valve according to a first embodiment of the present invention.
Figure 8:
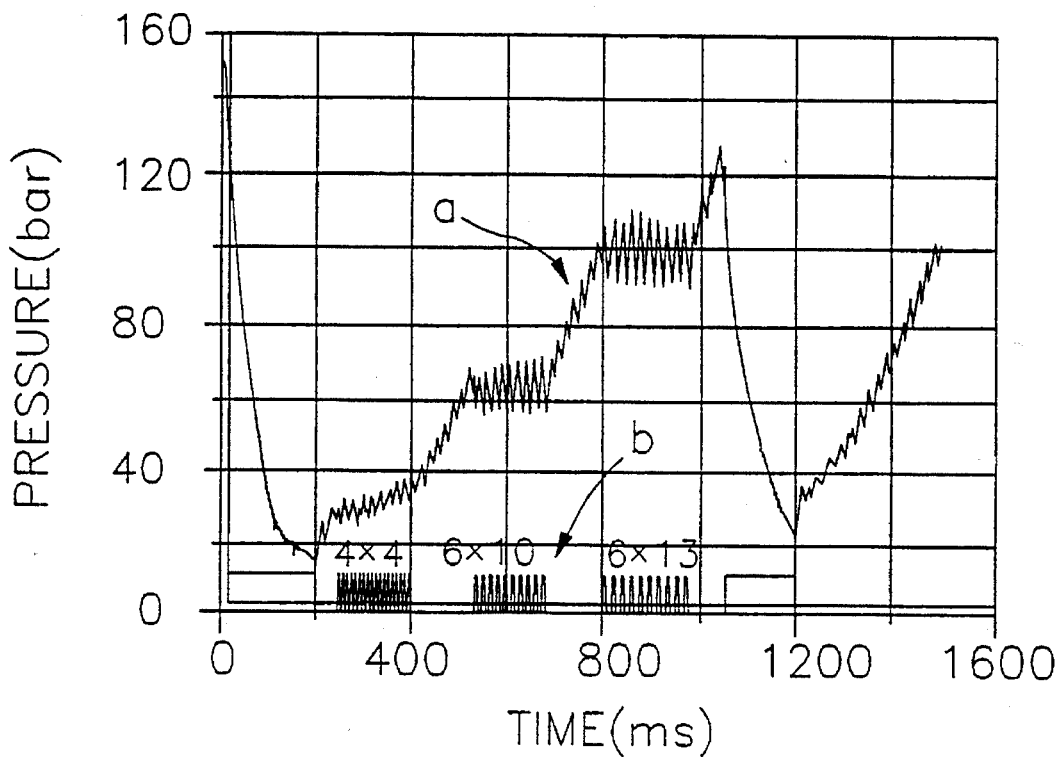
FIG. 8 is a graph showing the change of the pressure of brake wheel cylinder with the lapse of time and being acquired by testing an anti-lock brake system provided with the 2/3 solenoid valve according to the first embodiment of the present invention shown in FIG. 2.
Figure 9:
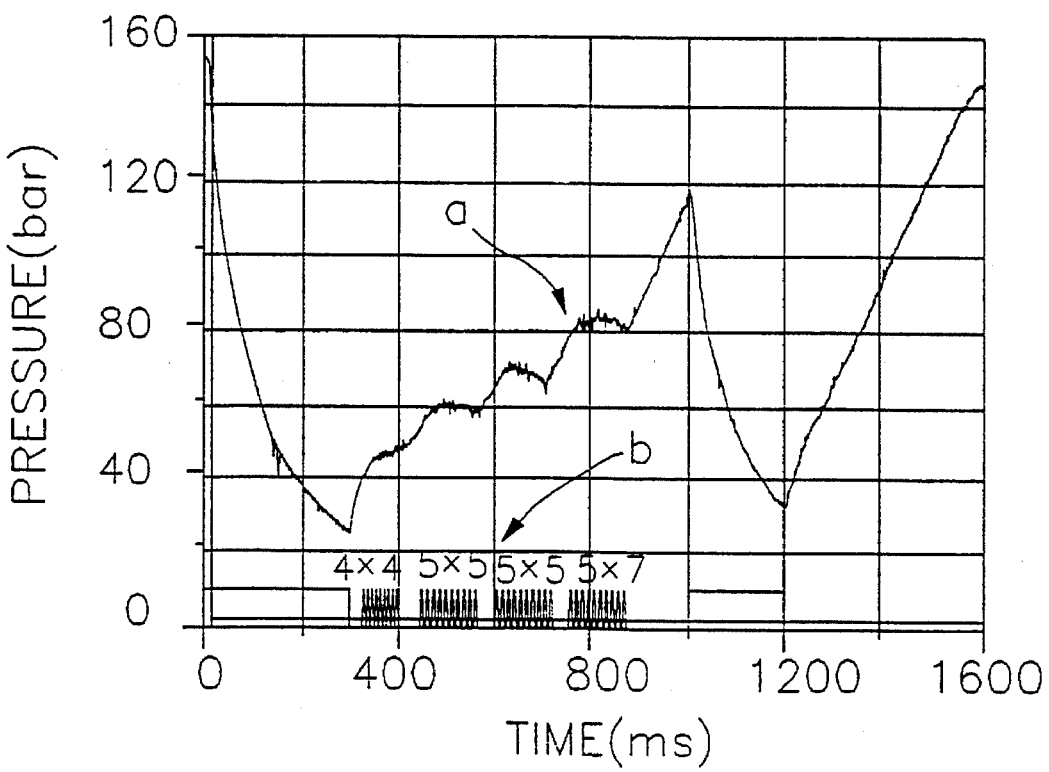
FIG. 9 is a graph showing the change of the pressure of brake wheel cylinder with the lapse of time and being acquired by testing an anti-lock brake system provided with the 2/3 solenoid valve according to the second embodiment of the present invention shown in FIG. 3.

FIG. 8 is a graph for showing the relationship between the pressure of the brake wheel cylinder and the time, the graph being acquired by testing anti-lock brake system 300 provided with 2/3 solenoid valve 100 according to the first embodiment of the present invention shown in FIG. 2. FIG. 9 is a graph for showing the relationship between the pressure of the brake wheel cylinder and the time, the graph being acquired by testing anti-lock brake system 300 provided with 2/3 solenoid valve 100' according to the second embodiment of the present invention shown in FIG. 3.

With reference to FIGS. 8 and 9, the horizontal axis is a time axis and the vertical axis is a pressure axis. Further, "a" represents the change of the pressure in brake wheel cylinder and "b" represents the waveform of the signal supplied to solenoid valve. As shown, the increase mode is accomplished by OFF signal, the decrease mode is accomplished by ON signal and the hold mode is accomplished by pulse-width modulation signal in which ON and OFF signals are repeated with a predetermined time period.

In FIG. 8, it can be seen that the fluctuation of about 10 to 20 bar takes place in the hold mode and the fluctuation of about 5 to 10 bar takes place in the increase mode. The fluctuation may induce trouble for master cylinder and the unstable operation of anti-lock brake system. As shown in FIG. 9, the fluctuation is almost removed by utilizing 2/3 solenoid valve 100' shown in FIG. 3 according to the second embodiment of the present invention.

The 2/3 solenoid valve according to the present invention is simply constructed and has the reduced number of component parts. As the result, the possibility of operational errors becomes low to enhance the reliability of operation. Also, the response time of the 2/3 solenoid valve becomes short, so that an anti-lock brake system having the good performance can be constructed.

The modulator according to the present invention can be assembled easily, has a compact design capable of reducing the installation space of modulator and the weight thereof, and hence, can be fabricated at a low cost.

The anti-lock brake system according to the present invention is simply constructed to reduce the possibility of the erroneous operation, since one 2/3 solenoid valve is assigned to one channel so that the number of solenoid driven valves is reduced. Therefore, the anti-lock brake system has the reliable braking characteristic.

While the present invention has been particularly shown and described with reference to particular embodiment thereof, it will be understood by those skilled in the art that various changes and modifications may be effected therein without departing from the spirit and scope of the invention as defined by the appended claims.

What is claimed is:

1. A solenoid valve comprising:

a valve body having a housing with a first port for receiving fluid from a fluid generating source, a second port for flowing in/flowing out said fluid and a third port for exhausting said fluid, and a cover hermetically coupled to one end of said housing for closing said one end of said housing;

a barrier wall for partitioning a chamber surrounded by said housing and cover within said valve body into first and second chambers and having a first opening for communicating said first chamber with said second chamber, said first chamber being communicated with said first port and said second chamber being communicated with said second and third ports;

opening/closing means movable along lengthwise direction of said valve body for alternatively opening and closing said first opening and said third port in response to an electric signal, and being positioned at a first position of closing said third port and opening said first opening in a normal state that said electric signal is not applied or at a second position of closing said first opening and opening said third port in an active state that said electric signal is applied, whereby said first port is communicated with said second port or said second port is communicated with said third port; and a solenoid assembly having an annular solenoid coil, a bobbin wound by said annular solenoid coil and a pair of electrodes electrically connected to said annular solenoid coil and exposed to the outside of said valve body for moving said opening/closing means to said second position from said first position in response to said electric signal, wherein said second port is composed of two holes which are formed through said housing to be mutually opposite each other and an orifice for reducing the fluctuation of hydraulic pressure through said second port and a check valve for promptly reducing the hydraulic pressure within said second chamber are each further installed in said holes, wherein said opening/closing means comprises:
an armature moving along said lengthwise direction in response to a magnetic force generated by said solenoid assembly;
a cover spring, one end thereof supported on a closed end of a hole formed in the center of a protrusion of said cover and the other end thereof supported on said armature;
a spring supporting rod fixed to one end of said armature and inserted in said cover spring to support said cover spring;
a push rod fixed to the other end of said armature; and
a spool integrally formed with said push rod, wherein said cover, said spring supporting rod, said armature and said push rod are included within said first chamber, said spool is included within said second chamber, and said push rod extends through said first opening to be connected to said spool included within said second chamber, wherein said barrier wall is formed by an inlet nozzle, said third port is a second opening formed at an outlet nozzle which is installed opposingly to said inlet nozzle, and the diameter of said first opening formed at said inlet nozzle is larger than that of said push rod passing through said first opening to provide a gap between said first opening and said push rod, said gap communicating said first chamber with said second chamber, wherein said first chamber is formed within said housing to be surrounded by said inlet nozzle, a protrusion formed in the center of said cover and a cylindrical sealing member and said second chamber is formed within said housing to be surrounded by said inlet nozzle and said outlet nozzle, and wherein said bobbin is fitted along the circumference of said cylindrical sealing member, said protrusion is hermetically fitted in one end of said cylindrical sealing member, and the other end thereof is hermetically coupled with an inner surface of said housing, wherein an inlet valve seating surface and an outlet valve seating surface are formed on said inlet nozzle and said outlet nozzle respectively to seat said spool, and said inlet valve seating surface and said outlet valve seating surface are shaped to match with said spool, whereby said first opening or said second opening is closed, when said spool is seated on said inlet valve seating surface or said outlet valve seating surface, further comprising a bushing provided between said armature and said barrier wall for supporting said push rod.

2. A solenoid valve comprising:
a valve body having a housing with a first port for receiving fluid from a fluid generating source, a second port for flowing in/flowing out said fluid and a third port for exhausting said fluid, and a cover hermetically coupled to one end of said housing for closing said one end of said housing;
a barrier wall for partitioning a chamber surrounded by said housing and cover within said valve body into first and second chambers and having a first opening for communicating said first chamber with said second chamber, said first chamber being communicated with said first port and said second chamber being communicated with said second and third ports;
opening/closing means movable along lengthwise direction of said valve body for alternatively opening and closing said first opening and said third port in response to an electric signal, and being positioned at a first position of closing said third port and opening said first opening in a normal state that said electric signal is not applied or at a second position of closing said first opening and opening said third port in an active state that said electric signal is applied, whereby said first port is communicated with said second port or said second port is communicated with said third port; and
a solenoid assembly having an annular solenoid coil, a bobbin wound by said annular solenoid coil and a pair of electrodes electrically connected to said annular solenoid coil and exposed to the outside of said valve body for moving said opening/closing means to said second position from said first position in response to said electric signal, wherein said second port is composed of two holes which are pierced through said housing to be mutually opposite each other, and an orifice for reducing the fluctuation of hydraulic pressure through said second port and a check valve for promptly reducing the hydraulic pressure within said second chamber are each further installed in said holes.

3. The solenoid valve as claimed in claim 2, wherein said opening/closing means comprises:
an armature moving along said lengthwise direction in response to a magnetic force generated by said solenoid assembly;
a cover spring, one end thereof supported on a closed end of a hole formed in the center of a protrusion of said cover and the other end thereof supported on said armature;
a spring supporting rod fixed to one end of said armature and inserted in said cover spring to support said cover spring;
a push rod fixed to the other end of said armature; and
a spool integrally formed with said push rod, wherein said cover, said spring supporting rod, said armature and said push rod are included within said first chamber, said spool is included within said second chamber, and said push rod extends through said first opening to be connected to said spool included within said second chamber.

4. The solenoid valve as claimed in claim 2, wherein said barrier wall is formed by an inlet nozzle, said third port is a second opening formed at an outlet nozzle which is installed opposite to said inlet nozzle, and the diameter of said first opening formed at said inlet nozzle is larger than that of said push rod passing through said first opening to provide a gap between said first opening and said push rod, said gap communicating said first chamber with said second chamber.

5. The solenoid valve as claimed in claim 4, wherein said first chamber is formed within said housing to be surrounded by said inlet nozzle, a protrusion formed in the center of said cover and a cylindrical sealing member and said second chamber is formed within said housing to be surrounded by said inlet nozzle and said outlet nozzle, and wherein said bobbin is fitted along the circumference of said cylindrical sealing member, said protrusion is hermetically fitted in one end of said cylindrical sealing member, and the other end thereof is hermetically coupled with an inner surface of said housing.

6. The solenoid valve as claimed in claim 5, wherein an inlet valve seating surface and an outlet valve seating surface are formed on said inlet nozzle and said outlet nozzle respectively to seat said spool, and said inlet valve seating surface and said outlet valve seating surface are shaped to match with said spool, whereby said first opening or said second opening is closed, when said spool is seated on said inlet valve seating surface or said outlet valve seating surface.

7. The solenoid valve as claimed in claim 3, further comprising a bushing provided between said armature and said barrier wall for supporting said push rod.

8. A modulator for anti-lock brake system comprising:

an electric motor;

first and second pumps driven by said electric motor and provided into a modulator block;

first, second, third and fourth solenoid valves installed into said modulator block for intermitting the fluid flow in response to an electric signal;

first and second dampers provided into said modulator block to be communicated with the respective outlets of said first and second pumps for temporarily receiving the fluid flowing out from said first and second pumps to reduce the fluctuation of hydraulic pressure generated from said first and second pumps; and first and second accumulators provided into said modulator block to be communicated with the respective inlets of said first and second pumps for temporarily receiving the fluid flowing out from said first and second solenoid valves and said third and fourth solenoid valves to reduce the hydraulic pressure within said first to fourth solenoid valves promptly, wherein each of said first to fourth solenoid valves comprises:

a valve body having a housing with a first port for receiving fluid from a fluid generating source, a second port for flowing in/flowing out said fluid and a third port for exhausting said fluid, and a cover hermetically coupled to one end of said housing for closing said one end of said housing;

a barrier wall for partitioning a chamber surrounded by said housing and cover within said valve body into first and second chambers and having a first opening for communicating said first chamber with said second chamber, said first chamber being communicated with said first port and said second chamber being communicated with said second and third ports;

opening/closing means movable along lengthwise direction of said valve body for alternatively opening and closing said first opening and said third port in response to an electric signal, and being positioned at a first position of closing said third port and opening said first opening in a normal state that said electric signal is not applied or at a second position of closing said first opening and opening said third port in an active state that said electric signal is applied, whereby said first port is communicated with said second port or said second port is communicated with said third port; and a solenoid assembly having an annular solenoid coil, a bobbin wound by said annular solenoid coil and a pair of electrodes electrically connected to said annular solenoid coil and exposed to the outside of said valve body for moving said opening/closing means to said second position from said first position in response to said electric signal, wherein said second port is composed of two holes which are pierced through said housing to be mutually opposite each other and an orifice for reducing the fluctuation of hydraulic pressure through said second port and a check valve for promptly reducing the hydraulic pressure within said second chamber are each further installed in said holes.

9. The modulator as claimed in claim 8, wherein three O-rings are provided along the circumference of said first to fourth solenoid valves to maintain the hermetical state between said first to third ports while said first to fourth solenoid valves are installed, whereby the installation of said first to fourth solenoid valves is completed only by inserting them into cylinders for a valve formed in said modulator block.

10. The modulator as claimed in claim 8, wherein each of said first and second dampers is formed by a cylinder for a damper and a cover for a damper in said modulator block, and each of said first and second accumulators is formed by a cylinder for an accumulator, a cover for accumulator and a spring for an accumulator in said modulator block.

11. An anti-lock brake system for a vehicle having at least one wheel provided with a wheel brake, a brake pedal operable by the vehicle driver and a master cylinder actuated by the brake pedal and having an outlet connected to supply brake fluid to actuate the wheel brake, said system comprising:

a wheel speed sensor provided to said wheel for sensing the speed of wheel;

a pressure generating portion including a electric motor and at least one pump driven by said electric motor and having an inlet and an outlet;

a 2-position 3-way solenoid valve having a first port communicated with both said outlet of said pump and said master cylinder, a second port communicated with said brake wheel cylinder and a third port communicated with said inlet of said pump, said valve only movable between a first position wherein said first and second ports are communicated with each other to increase the pressure of said brake wheel cylinder and a second position wherein said second and third ports are communicated with each other to decrease the pressure of said brake wheel cylinder;

a damper communicated with said outlet of said pump for temporarily receiving the brake fluid flowing out from said pump to reduce the fluctuation of hydraulic pressure generated therefrom;

an accumulator communicated with said inlet of said pump for temporarily receiving the fluid flowing out from said 2-position 3-way solenoid valve to reduce the hydraulic pressure within said 2-position 3-way solenoid valve promptly; and control means for controlling the operation of said 2-position 3-way solenoid valve to increase, decrease or hold pressure of said brake wheel cylinder, said control means receiving a speed signal from said wheel speed sensor and outputting a valve-actuated signal having a predetermined time period to said solenoid valve whereby said solenoid valve is maintained in said first position or said second position during said predetermined time period in response to said valve-actuated signal, said 2-position 3-way solenoid valve comprising:
- a valve body having a housing with said first port for receiving fluid from said pressure generating portion, said second port for flowing in/flowing out said fluid and said third port for exhausting said fluid, and a cover hermetically coupled to one end of said housing for closing said one end of said housing;
- a barrier wall for partitioning a chamber surrounded by said housing and cover within said valve body into first and second chambers and having a first opening for communicating said first chamber with said second chamber, said first chamber being communicated with said first port and said second chamber being communicated with said second and third ports;
- opening/closing means movable along lengthwise direction of said valve body for alternatively opening and closing said first opening and said third port in response to an electric signal, and being positioned at said first position of closing said third port and opening said first opening in a normal state that said electric signal is not applied or at said second position of closing said first opening and opening said third port in an active state that said electric signal is applied, whereby said first port is communicated with said second port or said second port is communicated with said third port; and
- a solenoid assembly having an annular solenoid coil, a bobbin wound by said annular solenoid coil and a pair of electrodes electrically connected to said annular solenoid coil and exposed to the outside of said valve body for moving said opening/closing means to said second position from said first position in response to said electric signal, wherein said second port is composed of two holes which are pierced through said housing to be mutually opposite each other and an orifice for reducing the fluctuation of hydraulic pressure through said second port and a check valve for promptly reducing the hydraulic pressure within said second chamber are each further installed in said holes.

12. The anti-lock brake system as claimed in claim 11, wherein said valve-actuated signal is a pulse-width-modulation signal.

13. The anti-lock brake system as claimed in claim 11, wherein said valve-actuated signal is a bang-bang control signal.

* * * * *